US012645594B2

(12) United States Patent
Ro et al.

(10) Patent No.: US 12,645,594 B2
(45) Date of Patent: Jun. 2, 2026

(54) DEVICE AND METHOD WITH CACHE COHERENCY MAINTENANCE FOR PIM OPERATIONS

(71) Applicant: SAMSUNG ELECTRONICS CO., LTD., Suwon-si (KR)

(72) Inventors: Yuhwan Ro, Suwon-si (KR); Hyunsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 18/415,083

(22) Filed: Jan. 17, 2024

(65) Prior Publication Data

US 2024/0241828 A1 Jul. 18, 2024

(51) Int. Cl.
*G06F 12/0815* (2016.01)
*G06F 12/0837* (2016.01)
*G06F 12/0891* (2016.01)

(52) U.S. Cl.
CPC ...... *G06F 12/0815* (2013.01); *G06F 12/0837* (2013.01); *G06F 12/0891* (2013.01)

(58) Field of Classification Search
None
See application file for complete search history.

(56) References Cited

U.S. PATENT DOCUMENTS 10,049,044 B2 8/2018 Boyer et al.
2016/0292080 A1* 10/2016 Leidel ..................... G06F 8/441

2017/0262369 A1 9/2017 Murphy
2018/0239702 A1 8/2018 Farmahini Farahani et al.
2022/0188233 A1 6/2022 Kalamatianos et al.
2023/0021492 A1* 1/2023 Aga ..................... G06F 12/0891
2023/0205693 A1* 6/2023 Kotra .................. G06F 12/0811
711/122
2024/0070068 A1 2/2024 Kim et al.

FOREIGN PATENT DOCUMENTS

KR 10-1814577 B1 1/2018
KR 10-2292449 B1 8/2021

OTHER PUBLICATIONS

Ahn, Junwhan, et al. "PIM-enabled instructions: A low-overhead, locality-aware processing-in-memory architecture." *ACM SIGARCH Computer Architecture News* 43.3S (Jun. 2015): pp. 336-348.

(Continued)

*Primary Examiner* — Kaushikkumar M Patel
(74) *Attorney, Agent, or Firm* — NSIP Law

(57) ABSTRACT

Disclosed are an electronic device for maintaining the cache coherency of data related to a processing-in-memory (PIM) operation, a processor, and an operating method of the electronic device. The electronic device includes: a processor configured to, when processing an instruction causing a processing-in-memory (PIM) operation, selectively target, for movement from a cache to a memory, data related to the PIM operation that is stored in the cache; and the memory configured to, based on the targeting of the data for movement from the cache to the memory, receive the data from the cache, and perform the PIM operation on the data in the memory based on a command corresponding to the instruction that is relayed from the processor.

19 Claims, 7 Drawing Sheets

(56) References Cited

OTHER PUBLICATIONS

Lee, Sukhan, et al. "Hardware architecture and software stack for PIM based on commercial DRAM technology: Industrial product." *2021 ACM/IEEE 48th Annual International Symposium on Computer Architecture (ISCA)*. IEEE, 2021.

Hall, Mary, et al. "Mapping irregular applications to DIVA, a PIM-based data-intensive architecture." *Proceedings of the 1999 ACM/IEEE Conference on Supercomputing*. 1999.

Extended European Search Report Issued on Jun. 14, 2024, in Counterpart European Patent Application No. 24152083.2 (6 Pages in English).

* cited by examiner

Start

610

Move data related to PIM operation stored in cache to memory
when processing instruction causing PIM operation in processor

620

Receive data from processor in memory and perform PIM operation
on data in memory, based on instruction relayed from processor End

DEVICE AND METHOD WITH CACHE COHERENCY MAINTENANCE FOR PIM OPERATIONS

CROSS-REFERENCE TO RELATED APPLICATIONS

This application claims the benefit under 35 USC § 119(a) of Korean Patent Application No. 10-2023-0006910, filed on Jan. 17, 2023, in the Korean Intellectual Property Office, the entire disclosure of which is incorporated herein by reference for all purposes.

BACKGROUND

1. Field

The following description relates to a device and method with cache coherency maintenance for processing-in-memory (PIM) operation.

2. Description of Related Art

A general semiconductor memory device is functionally separate from a processor for performing an arithmetic operation. Accordingly, a bottleneck may occur when a large amount of data is transmitted and received between the semiconductor memory device and the processor, particularly when executing applications such as a neural network, big data, or Internet of Things (IoT), which require operations for a large amount of data. To solve this issue, research has been conducted on processing in memory (PIM) as a semiconductor memory device that combines a function of a memory with a function of a processor for performing an arithmetic operation. A PIM device may operate as a memory device and an arithmetic operation device. Data may be stored in a PIM device, maintained in the PIM device, and an arithmetic operation may be performed by the PIM device on the data that is stored in the PIM device before, during, and after the arithmetic operation. In other words, the arithmetic operation may be performed by the PIM device without having to specifically load the data in the PIM device for the arithmetic operation. In some cases, the data already maintained in the PIM device may serve as one operand of the arithmetic operation, and other data may be loaded into the PIM device to serve as a second operand of the arithmetic operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a processor configured to, when processing an instruction causing a processing-in-memory (PIM) operation, selectively target, for movement from a cache to a memory, data related to the PIM operation that is stored in the cache; and the memory configured to, based on the targeting of the data for movement from the cache to the memory, receive the data from the cache, and perform the PIM operation on the data in the memory based on a command corresponding to the instruction that is relayed from the processor.

The processor may be further configured such that the selective targeting targets a cache line of the cache to be a unit of moving the data related to the PIM operation to the memory.

A state of the cache line may be set to an invalid state in association with moving the data to the memory.

The processor may be further configured to: check a state of a cache line storing the data related to the PIM operation when performing the processing of the instruction causing the PIM operation, and determine whether to move the data stored in the cache line to the memory based on determining whether the cache line state is a modified state.

The processor may be further configured to relay the instruction to the memory without moving the data from the cache to the memory based on determining that the cache line state is an invalid state.

The processor may be further configured to: move a result of the PIM operation from the memory to the cache based on determining that a non-PIM instruction is to perform an operation on the result of the PIM operation, and perform the operation of the non-PIM instruction on the result of the PIM operation stored that is in the cache due to the moving thereof from the memory.

The moving the data from the cache to the memory may prevent the PIM operation from causing an incoherency between the cache and the memory.

The processor may be further configured to determine to selectively target the data for movement from the cache to the memory based on either: determining that the instruction includes a memory address that is mapped to PIM memory included in the memory, or determining that the instruction is a PIM instruction.

The processor may include: a PIM instruction detector configured to determine whether an instruction to be executed in the processor causes a PIM operation; and a cache flush request generator configured to generate a cache flush request including an address of the data related to the PIM operation and transmit the generated cache flush request to the cache.

In another general aspect, a processor includes: a core configured to determine that an operation caused by execution of an instruction to be executed in the processor is a PIM type of operation and based thereon transmit, to a cache, a move request identifying data related to the PIM operation; the cache configured to, based on the move request, transmit, to a memory controller, a write request for writing the data to a memory to a memory controller; and the memory controller configured to transmit a write command to the memory based on the write request received from the cache.

The cache may be further configured to check a state of a cache line storing the data of which movement is requested, and transmit the write request for the data stored in the cache line to the memory controller when the checking determines that the state of the cache line is a modified state.

In another general aspect, there is a method of operating an electronic device including a processor and a memory, and the method includes: moving data determined to be related to a PIM operation stored in a cache to the memory when processing, in the processor, an instruction causing the PIM operation to be performed in the memory; receiving the data moved from the cache into the memory; and based on the instruction relayed from the processor, performing, by the memory, the PIM operation on the data in the memory.

The moving may include moving the data related to the PIM operation in a specified cache line to the memory.

A state of the specified cache line may be changed to an invalid state based on being determined to be related to the PIM operation.

The moving may include: checking a state of a cache line storing the data related to the PIM operation when processing the instruction causing the PIM operation and moving the data stored in the cache line based on determining that the cache line is in a modified state.

The method may further include determining whether to relay the instruction to the memory without moving the data to the memory based on whether the cache line is in an invalid state.

The method may further include: moving a result of the PIM operation from the memory to the cache in the processor when processing an instruction performing an operation directly on the result of the PIM operation; and performing the operation in the processor on the result of the PIM operation stored in the cache.

The data related to the PIM operation may be moved to the memory by being checked with respect to, and in an order from, a first level cache of the cache to a last level cache of the cache.

The determining to move the data from the cache to the memory may include determining to selectively target the data for movement from the cache to the memory based on either: determining that the instruction includes a memory address that is mapped to PIM memory included in the memory, or determining that the instruction is a PIM instruction.

The memory may include a PIM memory device and non-PIM memory, and the method may further include: determining to not move from the cache second data related to a second instruction based on determining that the second instruction corresponds to a non-PIM operation.

Other features and aspects will be apparent from the following detailed description, the drawings, and the claims.

Figure 1:
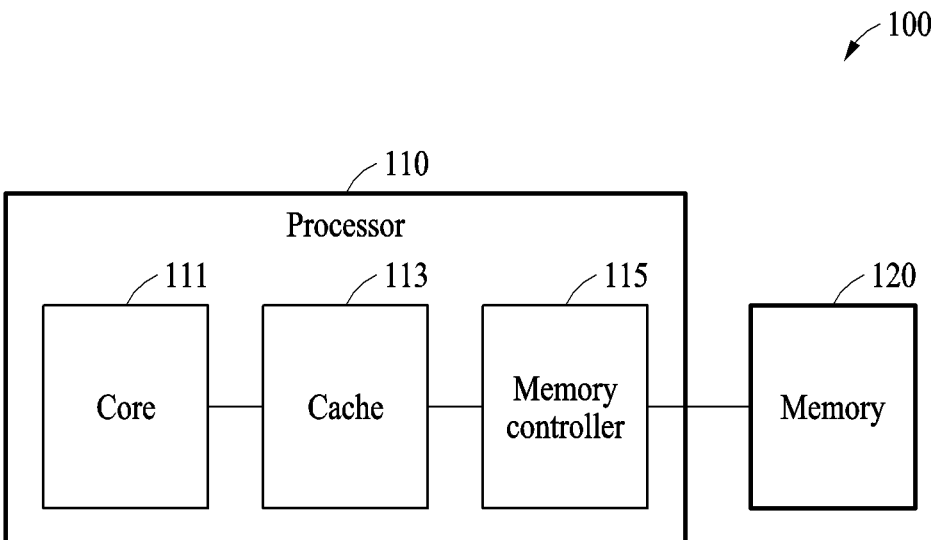
FIG. 1 illustrates an example of an electronic device, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of an electronic device, according to one or more embodiments.

Referring to FIG. 1, an electronic device 100 may include a processor 110 and a memory 120. The electronic device 100 may further include an accelerator (not shown). The memory 120 may include a PIM memory device.

The processor 110 may be a device configured to control the overall operation of the electronic device 100 and may include various processors, for example, a central processing unit (CPU), a graphics processing unit (GPU), a neural processing unit (NPU), a tensor processing unit (TPU), or a digital signal processor (DSP). The processor 110 may generate an instruction to be executed based on an instruction received from an application (not shown) and may control components (e.g., the memory 120) in the electronic device 100, based on the instruction.

The processor 110 may include a core 111, a cache 113, and a memory controller 115. The core 111 may be a unit for performing data processing, such as a physical operation, in the processor 110. The number of cores included in the processor 110 may be one or more. The cache 113 may be a memory that is more adjacent to the core 111 than the memory 120 and may temporarily store data that is frequently used when data is processed in the core 111. The performance of the electronic device 100 may be improved by reading data to be processed in the core 111 in the cache 113 having relatively lower access cost rather than in the memory 120. The memory controller 115 may manage a data flow that is input to or output from the memory 120. The memory controller 115 may generate a command according to a request relayed through the cache 113 and may relay the generated command to the memory 120.

The operations of the memory 120 that are controlled by the processor 110 may include general memory operations and PIM operations. The general memory operations may include the general operations of the memory 120 (e.g., read, write, copy, or erase). The generally memory operations may be performed for both non-PIM memory and PIM memory of the memory 120. The PIM operations may include arithmetic operations, such as addition, multiplication, or accumulation, and/or logical operations, such as AND, OR, or XOR. The PIM operations may have no need to read a large amount of operand data from the memory 120 to the processor 110 and/or the accelerator; only an operation result may need to be read to the processor 110 and/or the accelerator after an operation is directly performed in the memory 120. Accordingly, power consumption may be reduced by reducing data movement distance and minimizing the use of memory bandwidth.

The accelerator may be a device that operates according to the control of the processor 110 and may process tasks that are more efficiently processed in a separate, dedicated processor (that is, the accelerator) rather than the general-purpose processor 110 due to the nature of the tasks (e.g., operations according to a neural network or operations for many operands). For example, the accelerator may include a GPU, an NPU, a TPU, or a DSP.

The memory may include a PIM-device for performing a PIM operation through an internal operator of the PIM-device (other than ordinary non-PIM memory operations such as storing data). The PIM-device may be in the form of, for example, a dynamic random-access memory (DRAM), a high bandwidth memory (HBM), a graphics double data rate (GDDR), or a low-power double data rate (LPDDR), but examples are not limited thereto. As noted, the memory 120 may include a hardware device (e.g., PIM-device) for performing a PIM operation other than a general memory operation and may perform various operations by being programmed, for example.

For example, operand data of a general operation that is to be performed in the core 111 may be moved from the memory 120 to the cache 113. The core 111 may read then process the operand data in the cache 113. The core 111 may then write a result of the operation to the cache 113. Such a general operation may be referred to as a "cacheable operation" as the operation uses the cache 113.

However, a PIM operation performed in (and by) the PIM-device of the memory 120 (not in the core 111) may be performed in the memory 120 when the processor 110 relays a command corresponding to the PIM operation to the memory 120. In this case, without moving operand data for the PIM operation from the memory 120 to the cache 113, the PIM operation may be performed in the memory 120 on data in the memory 120 before, during, and after the PIM operation is performed thereon. The PIM operation may be referred to as a non-cacheable operation as it does not use the cache 113.

The PIM operation is generally considered to be a non-cacheable operation because if operand data of the PIM operation is cached in the cache 113, cached data that is changed by the core 111 may not be reflected in the memory 120, and the PIM operation may not be performed on the latest data. In addition, the data subjected to PIM operation is changed through the PIM operation in the memory 120, and such changed data may not be reflected in the cache 113. Therefore, the latest data may not be used if the cache 113 is used to access the changed data. To avoid these two issues, the processor 110 may operate in a non-cacheable manner with respect to the input and output data of the PIM operation. In other words, when performing a PIM operation, there may be a need to first perform a preparatory operation of moving data (e.g., the operand data of the PIM operation) related to the PIM operation from the cache 113 to the memory 120 (specifically, PIM memory of the memory 120). This preparatory operation is described in detail with reference to FIG. 2A.

The electronic device 100 may be in the form of, for example, any of various computing devices, such as a mobile phone, a smartphone, a tablet personal computer (PC), an e-book device, a laptop, a PC, a desktop, a workstation, or a server, various wearable devices, such as a smart watch, smart eyeglasses, a head-mounted display (HMD), or smart clothing, various home appliances such as a smart speaker, a smart television (TV), or a smart refrigerator, and other devices, such as a smart vehicle, a smart kiosk, an Internet of things (IoT) device, a walking assist device (WAD), a drone, a virtual machine (possibly using direct-device mappings), or a robot.

In addition, the electronic device 100 may be applied, without limit, to various products (e.g., an IoT device, a mobile device, an edge device, a computing device, a server, a camera, or a vehicle) including the memory 120 to which PIM technology is applied. The PIM technology may be embodied in, without limit, static RAM (SRAM), magnetic RAM (MRAM), flash memory, or next-generation memory, such as phase-change RAM (PRAM) or resistive RAM (RRAM).

Figure 2A:
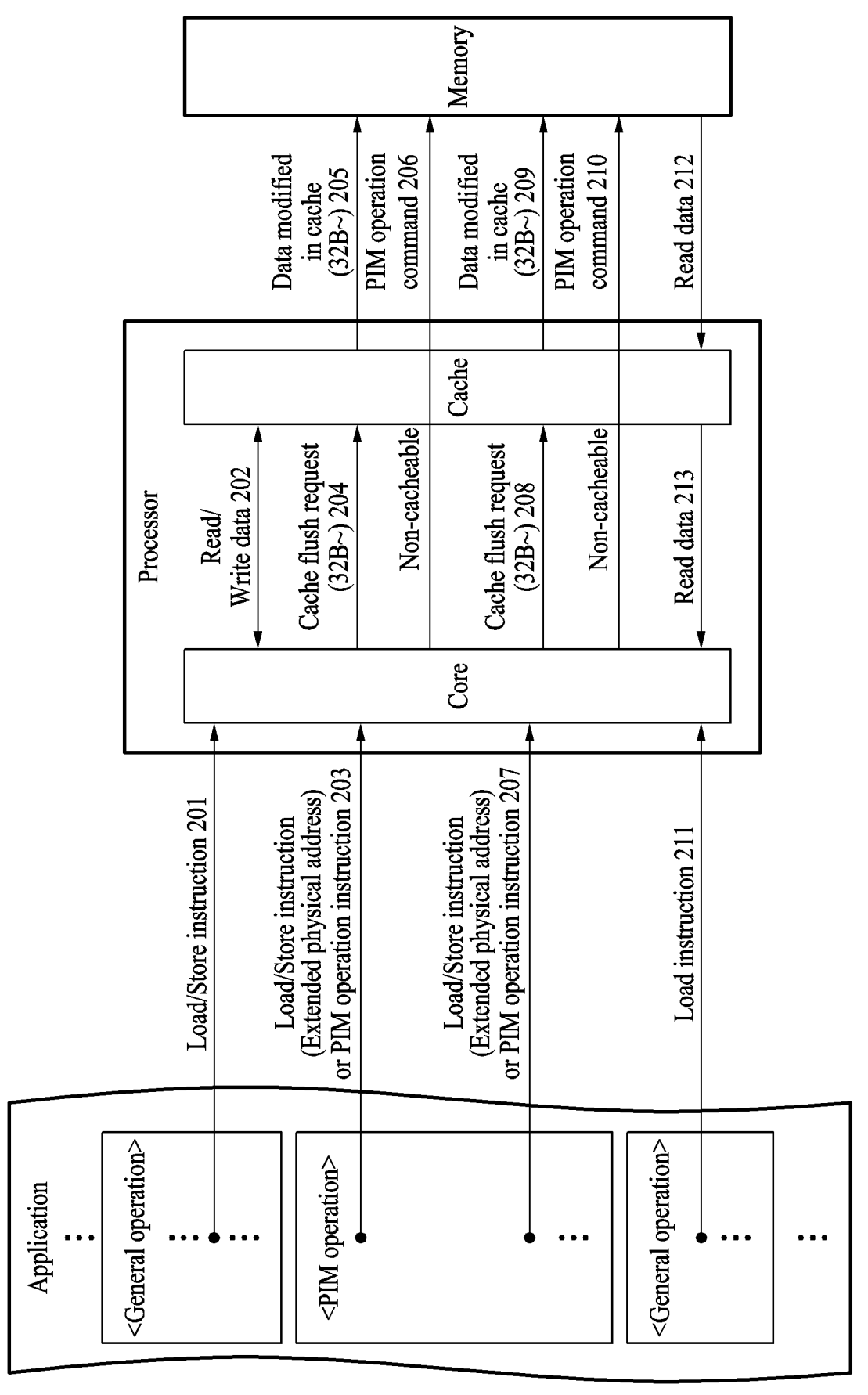
FIG. 2A illustrates an example of an operation of an electronic device, according to one or more embodiments.

FIG. 2A illustrates an example of an operation of an electronic device, according to one or more embodiments.

The example of FIG. 2A is shown from the perspectives of an application, a processor, and a memory. The application may have non-PIM instructions for general (non-PIM) operations and PIM instructions for PIM operations.

When performing a non-PIM instruction for a general (non-PIM) operation, in operation 201, the non-PIM instruction of the application may be a load instruction or a store instruction. In the case of a load instruction, a core of the processor executes the load instruction and reads general operation-related data through operations of the core. In the case of a store instruction, the core of the processor executes the store instruction and stores general operation-related data through operations of the core. In operation 202, the core that receives a load instruction from the application may read, from a cache, data that is sought to be accessed and stored in the cache (e.g., according to an operand of the load instruction). Alternatively, in operation 202, the core that receives a store instruction from the application may write data into the cache. Since these general non-PIM operations are cacheable operations, reading or writing data may be performed mainly through the core using the cache.

As shown in the example of FIG. 2A, in some cases a general (non-PIM) instruction may update or store data in the cache, and the general instruction may be followed by a PIM instruction that is to operate on that same data. In this case, when performing the PIM operation after the general operation, the latest value of the input data of the PIM operation remains in the cache and may not yet be reflected in the memory backed by the cache. Accordingly, before the PIM operation is performed, the core (for example) may initiate an operation of moving the latest data stored in the cache to the memory (specifically, to a PIM device or to a PIM portion of the memory), thus allowing the PIM operation to be performed on the latest data.

In operation 203, a PIM instruction of the application may be transmitted to the core. For example, the PIM instruction (causing the PIM operation) may be (1) a load (or store) instruction that includes an extended physical address (e.g., as an operand of the load/store instruction) or (2) a PIM operation instruction, although examples are not limited thereto.

In operation 204, when processing a PIM instruction causing a PIM operation based on receiving the PIM instruction of the application, the core may transmit a cache flush request to the cache with respect to data in the cache that is related to the PIM operation. In this case, performance of the cache flush may include performing a write-back operation or an invalidation operation. The write-back operation moves data stored in the cache to the memory and the invalidation operation flags the data stored in the cache as being invalid. The PIM instruction of the application received by the core includes the address information of the data to be processed by the PIM instruction/operation. Therefore, the core may transmit the cache flush request specifically for the data related to the PIM operation, based on the address information of the data. With a cache flush operation being automatically performed specifically on the data related to the PIM operation when the core processes the PIM instruction (causing the PIM operation), separate modification (e.g., inserting a cache flush application programming interface (API) call and inline assembly code into the instruction) of the instruction relayed from the application to the core or the help of software may be unnecessary. In addition, there may be an overall performance improvement in execution of the PIM instruction by performing a limited cache flush (for the data of the PIM instruction) rather than performing a complete cache flush.

Returning to FIG. 2A, in operation 205, based on the cache flush request received from the core and may invalidate the data in the cache, the cache (or a controller thereof) may move the data related to the PIM operation to the memory.

Figure 2B:
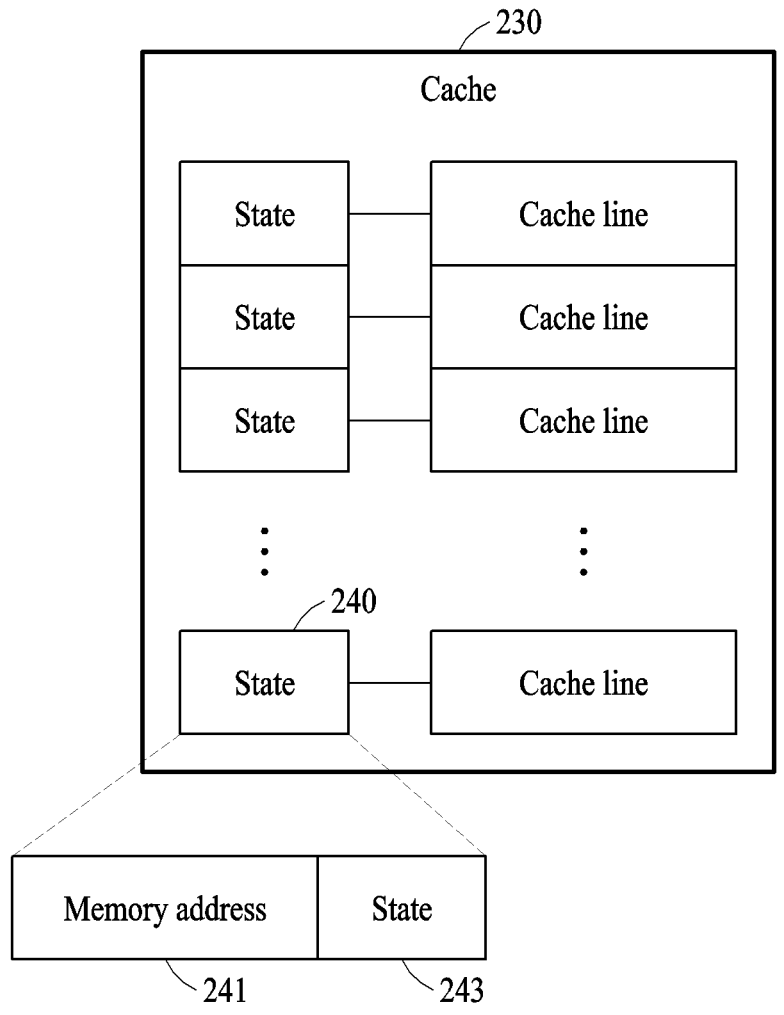
FIG. 2B illustrates an example of a cache, according to one or more embodiments.

FIG. 2B shows a cache 230 that may serve as the cache in FIG. 2A. The cache 230 may include cache lines. Each cache line may store a certain size (e.g., 32 bytes or 64 bytes) of data. The cache 230 may input and/or output, at once, data which is the same size as that of the cache lines. A cache line may be a basic unit in which data is processed (e.g., read or write) in the cache 230 and may be also referred to as a cache block according to embodiments. The cache 230 may have tags that respectively correspond to the cache lines. A tag 240 may include (i) a memory address 241 of data stored in its corresponding cache line and a state 243 of the cache line. For example, a tag's memory address may be an address where the data of a cache line corresponding to the memory address is stored in the memory. The state in the tag of a cache line may be set to different values to correspondingly indicate states such as: (1) a modified state in which the cache line is differentiated from a main storage device (e.g., the memory) with the cache line being modified and the data of the cache line exists in the cache only, (2) an exclusive state in which the data of the cache line is the same as that of the main storage device and does not exist in any other caches, (3) a shared state in which the data of the cache line is the same as that of the main storage device, and the same content of the cache line may exist in other caches, and (4) an invalid state in which the cache line does not have any valid data. There may be other cache states.

The cache 230 may move the data of one or more cache lines including the data related to the PIM operation to the memory, based on a cache flush request, and may change the one or more cache lines to an invalid state. In other words, an amount of data moved from the cache to the memory according to the cache flush request may be n times an amount of data stored in one cache line.

The cache flush operation may be performed in a unit of cache lines rather than in a unit of operating system (OS) pages and rather than performing a total cache flush. Accordingly, unnecessary movement of data from cache to the memory may be avoided, which may reduce latency overhead due to data movement. For example, a cache line unit may have 32 bytes in a mobile device or a GPU and may have 64 bytes in a server, but the examples of the cache line unit size are not limited thereto. An OS page may be a unit processed or managed in a mapping table, which is managed in an OS (e.g., by a memory manager), between a virtual address and a physical address and may have 1 to 4 kbytes, for example. The performance of a device may be improved through a fine-grained cache flush through where a flush is performed at the granularity of a cache line unit, which is generally smaller than an OS page unit or the total size of a cache.

Returning to FIG. 2A, in operation 206, the core may transmit a PIM operation command to the memory, and the memory (e.g., PIM memory) may perform the PIM operation on the data related to the PIM operation that has been moved into the memory from the cache. The PIM operation may be performed as a non-cacheable operation. Likewise, when performing the PIM operation after performing the related general (non-PIM/cacheable) operation, the cache flush operation may be performed on data to be used as an input to and/or output from the PIM operation.

In operation 207, since the amount of information (e.g., an input data address and/or output data address of the PIM operation) which a PIM instruction may have is limited, the PIM instruction of operation 203 may be executed by the application multiple times, but with different data addresses. Alternatively, as illustrated in the example of FIG. 2A, after transmitting PIM instruction of operation 203 (causing the earlier PIM operation) to the core, another PIM instruction of the application may be transmitted to the core. The number, types, and order of instructions of the application transmitted to the core and causing PIM operations is not limited to the example of FIG. 2A.

In operation 208, when processing the PIM instruction of operation 207, based on that PIM instruction, the core may transmit the cache flush request to the cache with respect to the data related to the PIM operation (which is in the cache before being flushed).

In operation 209, based on the cache flush request of operation 208 that the cache receives from the core, the cache may move the data related to the PIM operation to the memory and may invalidate that data in the cache (by setting the tag states of the corresponding cache line(s)).

In operation 207, when the core processes the PIM instruction causing the PIM operation, based on the PIM instruction relayed from the application, if the data related to the PIM operation has already been flushed, necessary data is already stored in the memory. Accordingly, operations 208 and 209 are skipped and operation 210 may be performed. This is described in detail with reference to FIG. 4.

In operation 210, the core may transmit the PIM operation command to the memory, and the memory may perform the PIM operation on the data related to the PIM operation moved from the cache. The PIM operation may be performed as a non-cacheable operation.

The descriptions provided for operations 204 to 206 also apply to operations 207 to 210, and thus more detailed description thereof is omitted.

When performing a general (non-PIM) operation after a PIM operation, the latest value of output data of the PIM operation remains in the memory and may not yet be reflected in the cache, i.e., may not be cached. Accordingly, when performing a general (non-PIM) operation after a PIM operation, a caching operation for the latest value of the output data of the PIM operation may be performed prior to the general operation. An example is described next.

In operation 211, a load instruction of the application for reading the general operation-related data (or a store instruction for storing the general operation-related data) may be transmitted to the core of the processor. In operation 212, the latest value of the output data of the PIM operation may be copied from the memory (e.g., in a PIM memory device) to the cache. In operation 213, the core may perform the general operation on the latest value by accessing the latest value of the output data of the PIM operation that is stored in the cache.

Figure 3:
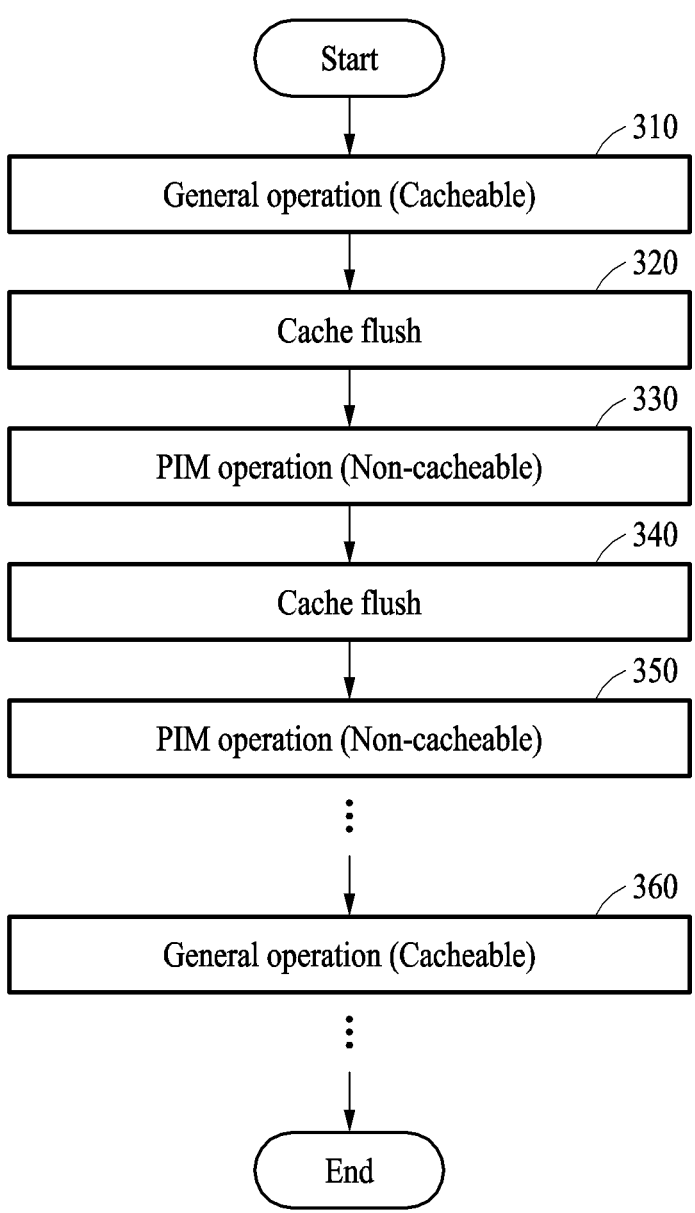
FIG. 3 illustrates an example of a cache flush operation, according to one or more embodiments.

FIG. 3 illustrates an example of a cache flush operation, according to one or more embodiments. The cache flush operation shown in FIG. 3 may performed at the granularity of a cache line unit.

In operation 310, an electronic device may process a general (non-PIM) operation as a cacheable operation. The result data of the general operation may be stored in a cache in the usual manner. In operation 320, prior to (and based on) performing a PIM operation, the electronic device may perform the cache flush operation on data (e.g., input data and/or output data of the PIM operation) related to the PIM operation. In operation 330, the electronic device may perform the PIM operation on the cache-flushed data as a non-cacheable operation. In operation 340, prior to performing the next PIM operation, the electronic device may perform the cache flush operation on data related to the PIM operation. In operation 350, the PIM operation may be performed as the non-cacheable operation. In operation 360, the electronic device may perform the general (non-PIM) operation as the cacheable operation. Since there is no data related to the general operation in the cache, the electronic device may perform the general operation after loading the data from a memory to the cache first.

Figure 4:
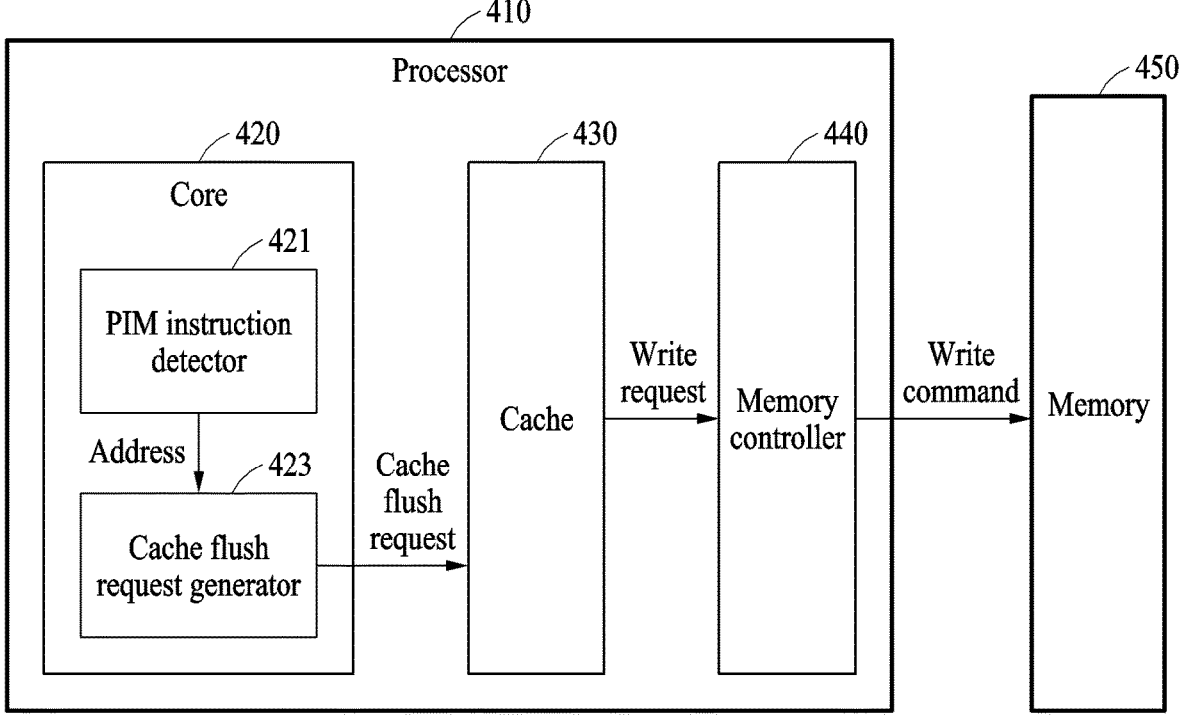
FIG. 4 illustrates an example of an operation of a processor, according to one or more embodiments.

FIG. 4 illustrates an example of an operation of a processor, according to one or more embodiments.

Referring to FIG. 4, a processor 410 may include a core 420, a cache 430, and a memory controller 440. The core 420 may include a PIM instruction detector 421 and a cache flush request generator 423. For example, the PIM instruction detector 421 and the cache flush request generator 423 may be included in the core 420 as separate hardware logic. In another example, the PIM instruction detector 421 and/or the cache flush request generator 423 may be implemented as a microcode microprogram.

The PIM instruction detector 421 may determine whether an instruction to be executed by the core 420 corresponds to an instruction causing a PIM operation. For example, the PIM instruction detector 421 may determine that the instruction to be executed corresponds to the instruction causing the PIM operation based on receiving (1) an application instruction that is determined to include a memory address that is mapped to PIM memory among a plurality of memory types or (2) an application instruction determined to correspond to the PIM operation (e.g., based on the opcode, a portion of the opcode, or a special bit in the application instruction). The condition (1) of an instruction including a memory address that is mapped to the PIM among the plurality of memory types is described with reference to FIG. 5. The condition (2) of an instruction corresponding to a PIM operation may correspond to an instruction set architecture (ISA) newly defined (or newly extended) for the PIM operation.

The PIM instruction detector 421 may transmit an address of data related to the PIM operation to the cache flush request generator 423 when determining that the instruction to be executed is an instruction causing a PIM operation, e.g., as part of, or in conjunction with, the cache flush request.

The cache flush request generator 423 may generate a cache flush request based on the address received from the PIM instruction detector 421 and may transmit the generated cache flush request to the cache 430 (or a component managing the cache 430).

Based on the cache flush request received from the cache flush request generator 423, the cache 430 may transmit, to the memory controller 440, a write request for writing the data related to the PIM operation in a memory 450. For example, based on memory addresses stored in respective tags of a plurality of cache lines, the cache 430 may determine whether the data targeted by the cache flush request is stored in one or more of the cache lines. If a cache line storing the data according to a memory address is limited to some among all the cache lines in the cache 430, the cache 430 may quickly determine whether the cache flush requested data is stored only by checking out tags of some cache lines corresponding to the memory address.

When the requested data is determined to be stored in a particular cache line, the cache 430 may check the state of the particular cache line (as indicated in the tag thereof) and may transmit a write request for the data stored in the cache line when the cache line is in a modified state, thus copying the data to memory. Then, the cache 430 may change the state of the cache line storing the data to an invalid state (thus preventing a later cache-memory incoherency). When it is determined that the requested data is not stored in any of the cache lines, a PIM operation command may be transmitted to the memory 450 without performing a flush operation on the data.

When the cache line is in the invalid state (e.g., when the data stored in the cache line has already been cache flushed), the cache 430 may not transmit the write request to the memory controller 440, a command corresponding to a PIM instruction may be transmitted to the memory 450, and the PIM operation may be performed in (and by) the memory 450. As such, data that has already been cache flushed may be prevented from being cache flushed until being processed to be cacheable again by a general operation. In addition, when the cache line is in the same state as a memory, the cache 430 may not transmit the write request to the memory controller 440, the command corresponding to the PIM instruction may be transmitted to the memory 450, and the PIM operation may be performed in (and by) the memory 450.

The memory controller 440 may generate a write command for writing the data that is related to the PIM operation in the memory 450, and may do so based on the write request received from the cache 430. The memory controller 440 may transmit the generated write command to the memory 450.

When there are multiple cache levels, the cache flush operation may be executed in an order from the first level cache of the cache 430 to the last level cache of the cache 430. The cache 430 may include various levels from the first level cache (closest to the core 420) to the last level cache (furthest from the core 420). This order may be used since data that is the most recently used in the core 420 is more likely to be stored in the first level cache than the last level cache. Result data of the general operation performed right before the PIM operation may be stored in the first level cache, and the cache flush operation may be applied from the first level cache to execute the PIM operation using the result data. When the data related to the PIM operation does not exist in the first level cache, the cache flush operation may be applied sequentially from the second level cache to the last level cache.

Figure 5:
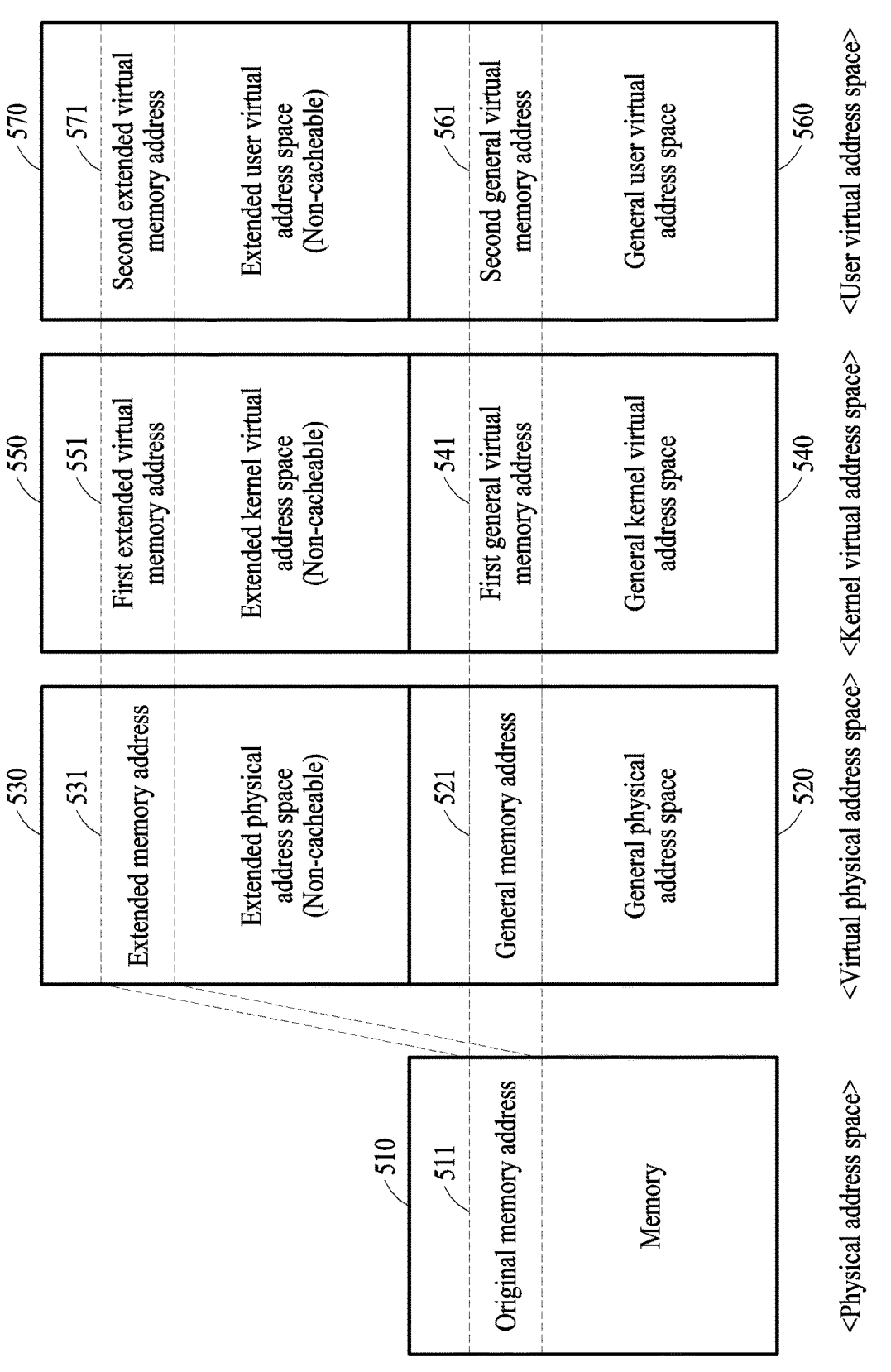
FIG. 5 illustrates an example memory architecture suitable for determining whether an instruction causes a processing-in-memory (PIM) operation based on an extended physical address, according to one or more embodiments.

FIG. 5 illustrates an example memory architecture suitable for determining whether an instruction causes a PIM operation based on an extended physical address, according to one or more embodiments.

FIG. 5 illustrates a physical address space, a virtual physical address space, a kernel virtual address space, and a user virtual address space. Whether an instruction corresponds to an instruction causing a PIM operation may be determined based on an address included in the instruction that is relayed from code (instructions) of an application to a core of a processor.

FIG. 5 further illustrates a memory address mapping relationship that can be used to determine whether the instruction causes a PIM operation. FIG. 5 illustrates an example of memory address mapping relationships to show one way a general memory instruction may be distinguished from a PIM instruction, however, examples and embodiments described herein are not limited thereto to the example shown in FIG. 5. In a memory address mapping relationship usable to distinguish general memory (non-PIM) instructions from two or more PIM instructions, the respective numbers of an extended physical address space 530, an extended kernel virtual address space 550, and an extended user virtual address space 570, which are illustrated in FIG. 5, may be the same as the number of the PIM instructions.

As noted above, a general non-PIM memory instruction may be a instruction that requests a general memory operation (e.g., read, write, copy, or erase). The general memory instruction may correspond to a general operation since data may be moved to the core of the processor to perform the general operation (e.g., without any of the constraints that might accompany PIM instructions/operations). In contrast, a PIM instruction may be an instruction that requests a PIM operation.

The physical address space may correspond to an actual memory 510 in which a memory command is executed. An original memory address 511 may be a partial memory area to which an instruction is to be applied in the memory 510.

The virtual physical address space for expressing a physical memory address to distinguish the general memory instruction from the PIM instruction may include a general physical address space 520 and the extended physical address space 530 that are each mapped to the memory 510. The general physical address space 520 may be an address space corresponding to the general memory instruction and may be the same as the physical address space described above. A general memory address 521 in the space may be the general memory instruction that is performed on the original memory address 511. The extended physical address space 530 may be an address space corresponding to the PIM instruction, and an extended memory address 531 in the space may be the PIM instruction that is performed on the original memory address 511.

The PIM instruction that is expressed by the extended physical memory address 531 (and is for executing an arithmetic operation in the memory 510) may have a non-cacheable feature since a command corresponding thereto may have to be relayed to the memory 510. On the other hand, an instruction expressed by the general memory address 521 may have a cacheable or non-cacheable feature depending on an application instruction.

The cacheable feature may be shown in a cache-accessible instruction and refers to the fact that an operation of finding requested data in the memory 510 having relatively high access overhead is performable after determining that the requested data is not in a cache having relatively low access overhead. When the data is in the cache, the data may be read quickly in the cache without reading the data in the memory 510, which improves performance. On the other hand, the non-cacheable feature may be shown in a instruction that may not access the cache and refers to the fact that the data requested by the application is read from the memory 510 without checking whether the data is in the cache. Since a PIM operation may be normally performed only when a command according to the PIM instruction is relayed to the memory 510, the PIM instruction may have the non-cacheable feature. Unlike the PIM instruction, the general memory instruction may have the cacheable or the non-cacheable feature according to an instruction of an application.

The kernel virtual address space may be an area that is managed by an OS running in an electronic device and may include a general kernel virtual address space 540 and the extended kernel virtual address space 550 that are each mapped to the memory 510. The general kernel virtual address space 540 may correspond to general memory instructions, and a first general virtual memory address 541 therein may be for general memory instructions performed on the original memory address 511. The extended kernel virtual address space 550 may correspond to PIM instructions, and a first extended virtual memory address 551 therein may be for the PIM instruction performed on the original memory address 511. The PIM instruction that is expressed by the first extended virtual memory address 551 (and is for executing an arithmetic operation in the memory 510) may have the non-cacheable feature since a command corresponding thereto may have to be relayed to the memory 510. On the other hand, an instruction expressed by the first general virtual memory address 541 may have the cacheable or non-cacheable feature depending on an application instruction.

The user virtual address space may be an area that is managed by each process running in the electronic device and may include a general user virtual address space 560 and an extended user virtual address space 570 that are each mapped to the memory 510. The general user virtual address space 560 may correspond to the general memory instruction, and a second general virtual memory address 561 therein may be for the general memory instruction performed on the original memory address 511. The extended user virtual address space 570 may correspond to the PIM instruction, and a second extended virtual memory address 571 therein may be for the PIM instruction performed on the original memory address 511. The PIM instruction that is expressed by the second extended virtual memory address 571 (and is for executing an arithmetic operation in the memory 510) may have the non-cacheable feature since a command corresponding thereto may have to be relayed to the memory 510. On the other hand, an instruction expressed by the second general virtual memory address 561 may have the cacheable or non-cacheable feature depending on an application instruction.

The first general virtual memory address 541, the first extended virtual memory address 551, the second general virtual memory address 561, and the second extended virtual memory address 571 may all be mapped to the same original memory address 511 but may have different memory types (e.g., PIM or non-PIM), and thereby, without adding a separate ISA, may be used to distinguish a general memory instruction from a PIM instruction. In addition, the processor may assign the memory 510 with the non-cacheable feature for the PIM instruction on the same memory area or may assign the memory 510 with the cacheable or non-cacheable feature for the general memory instruction, depending on which type of instruction is accessing the same memory area for example.

Figure 6:
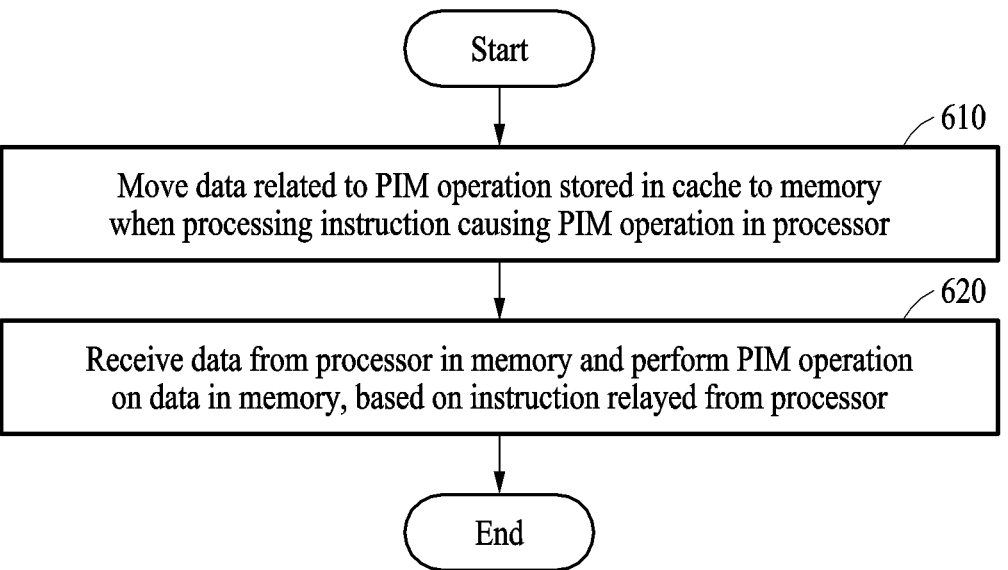
FIG. 6 illustrates an example of an operating method of an electronic device, according to one or more embodiments.

FIG. 6 illustrates an example of an operating method of an electronic device, according to one or more embodiments.

In operation 610, the electronic device may move data related to a PIM operation stored in a cache to memory when processing, in a processor (e.g., a host processor), an instruction causing the PIM operation. The electronic device may move the data related to the PIM operation to the memory in a unit of a cache line. The state of a cache line having the data related to the PIM operation (which is moved to the memory) may be changed to an invalid state.

The electronic device may check the state of a cache line storing the data related to the PIM operation when processing the instruction that causes the PIM operation and may move the data stored in the cache line when the cache line is determined to be in a modified state.

The electronic device may relay the instruction to the memory without moving the data to the memory when the cache line is determined to be in the invalid state.

The data related to the PIM operation may be checked for in the cache by checking the cache in an order from a first level cache of the cache to a last level cache of the cache.

When receiving an instruction including a memory address that is mapped to PIM memory among a plurality of memory types or when receiving an instruction that corresponds to the PIM operation, the electronic device may move the data related to the PIM operation to the memory.

In operation 620, the electronic device may receive the data in the memory and may perform the PIM operation on the data in the memory (and the memory may perform the operation), based on the instruction relayed from the processor.

The electronic device may move a result of the PIM operation from the memory to the cache when processing an instruction directly performing an operation on the result of the PIM operation in the processor and may perform the operation on the result of the PIM operation stored in the cache.

According to an embodiment, the electronic device may maintain the cache coherency of the data related to the PIM operation with minimum overhead by performing a cache flush operation in the cache line unit on the data related to the PIM operation automatically when processing the instruction causing the PIM operation in the processor.

The descriptions provided with reference to FIGS. 1 to 5 may apply to the operations shown in FIG. 6, and thus further detailed descriptions are omitted.

The computing apparatuses, the electronic devices, the processors, the memories, the displays, the information output system and hardware, the storage devices, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:

a processor configured to, when processing an instruction causing a processing-in-memory (PIM) operation, selectively target, for movement from a cache to a memory, data related to the PIM operation that is stored in the cache; and the memory configured to, based on the targeting of the data for movement from the cache to the memory, receive the data from the cache, and perform the PIM operation on the data in the memory based on a command corresponding to the instruction that is relayed from the processor, wherein the processor comprises:

a core including:

a PIM instruction detector configured to determine whether the instruction to be executed in the process PIM operation and transmit an address of data related to the PIM operation to a cache flush request generator based on determining that the instruction to be executed causes a PIM operation; and the cache flush request generator configured to generate a cache flush request comprising the address of the data related to the PIM operation and transmit the cache flush request to the cache; and a memory controller configured to transmit the data related to the PIM operation based on the cache flush request from the cache to the memory.

2. The electronic device of claim 1, wherein the processor is further configured such that the selective targeting targets a cache line of the cache to be a unit of moving the data related to the PIM operation to the memory.

3. The electronic device of claim 2, wherein a state of the cache line is set to an invalid state in association with moving the data to the memory.

4. The electronic device of claim 1, wherein the processor is further configured to check a state of a cache line storing the data related to the PIM operation when performing the processing of the instruction causing the PIM operation, and determine whether to move the data stored in the cache line to the memory based on determining whether the cache line state is a modified state.

5. The electronic device of claim 4, wherein the processor is further configured to relay the instruction to the memory without moving the data from the cache to the memory based on determining that the cache line state is an invalid state.

6. The electronic device of claim 1, wherein the processor is further configured to move a result of the PIM operation from the memory to the cache based on determining that a non-PIM instruction is to perform an operation on the result of the PIM operation, and perform the operation of the non-PIM instruction on the result of the PIM operation stored that is in the cache due to the moving thereof from the memory.

7. The electronic device of claim 1, wherein the moving the data from the cache to the memory prevents the PIM operation from causing an incoherency between the cache and the memory.

8. The electronic device of claim 1, wherein the processor is further configured to determine to selectively target the data for movement from the cache to the memory based on either:

determining that the instruction comprises a memory address that is mapped to PIM memory comprised in the memory, or determining that the instruction is a PIM instruction.

9. A processor comprising:

a core configured to determine that an operation caused by execution of an instruction to be executed in the processor is a PIM type of operation and based thereon transmit, to a cache, a move request including an address of data related to the PIM operation;

the cache configured to, based on the move request, transmit, to a memory controller, a write request for writing the data to the memory; and the memory controller configured to transmit a write command to the memory based on the write request received from the cache, to transfer data related to the PIM operation from the cache to the memory.

10. The processor of claim 9, wherein the cache is further configured to check a state of a cache line storing the data of which movement is requested, and transmit the write request for the data stored in the cache line to the memory controller when the checking determines that the state of the cache line is a modified state.

11. A method of operating an electronic device comprising a processor and a memory, the method comprising:

moving data determined to be related to a PIM operation stored in a cache to the memory when processing, in the processor, an instruction causing the PIM operation to be performed in the memory;

receiving the data moved from the cache into the memory; and based on the instruction relayed from the processor, performing, by the memory, the PIM operation on the data in the memory, wherein the moving comprises:

determining whether the instruction to be executed in the processor causes a PIM operation and transmit an address of data related to the PIM operation to a cache flush request generator based on determining that the instruction to be executed causes a PIM operation;

generating a cache ush request comprising the address of the data related to the PIM operation and transmit the cache flush request to the cache; and transmitting the data related to the PIM operation based on the cache flush request from the cache to the memory.

12. The method of claim 11, wherein the moving comprises moving the data related to the PIM operation in a specified cache line to the memory.

13. The method of claim 12, wherein a state of the specified cache line is changed to an invalid state based on being determined to be related to the PIM operation.

14. The method of claim 11, wherein the moving comprises:

checking a state of a cache line storing the data related to the PIM operation when processing the instruction causing the PIM operation and moving the data stored in the cache line based on determining that the cache line is in a modified state.

15. The method of claim 14, further comprising determining whether to relay the instruction to the memory without moving the data to the memory based on whether the cache line is in an invalid state.

16. The method of claim 11, further comprising:

moving a result of the PIM operation from the memory to the cache in the processor when processing an instruction performing an operation directly on the result of the PIM operation; and performing the operation in the processor on the result of the PIM operation stored in the cache.

17. The method of claim 11, wherein the data related to the PIM operation is moved to the memory by being checked with respect to, and in an order from, a first level cache of the cache to a last level cache of the cache.

18. The method of claim 11, wherein the memory comprises a PIM memory device and non-PIM memory, wherein the method further comprises:

determining to not move second data related to a second instruction based on determining that the second instruction corresponds to a non-PIM operation.

19. A non-transitory computer-readable storage medium storing instructions that, when executed by a processor, cause the processor to perform the method of claim 11.

* * * * *